(12) United States Patent
Fukushima et al.

(10) Patent No.: US 11,390,152 B2
(45) Date of Patent: Jul. 19, 2022

(54) DIVISION BAR FOR AUTOMOBILE AND METHOD OF MANUFACTURING DIVISION BAR

(71) Applicant: NISHIKAWA RUBBER CO., LTD., Hiroshima (JP)

(72) Inventors: Takashi Fukushima, Hiroshima (JP); Toshifumi Matsuura, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days.

(21) Appl. No.: 17/172,204

(22) Filed: Feb. 10, 2021

(65) Prior Publication Data

US 2021/0260976 A1 Aug. 26, 2021

(30) Foreign Application Priority Data

Feb. 20, 2020 (JP) .............................. JP2020-027629

(51) Int. Cl.
*E05F 1/00* (2006.01)
*B60J 10/78* (2016.01)
*B62D 65/06* (2006.01)

(52) U.S. Cl.
CPC .............. *B60J 10/78* (2016.02); *B62D 65/06* (2013.01)

(58) Field of Classification Search
CPC ......... B60J 10/78; B62D 65/06; B62D 65/024
USPC .............. 49/440, 441; 296/216.01, 221, 222, 296/216.04, 216.06, 216.07
See application file for complete search history.

(56) References Cited

U.S. PATENT DOCUMENTS

| 4,666,206 | A | * | 5/1987 | Hough | B60R 13/0206 296/216.07 |
| 4,783,116 | A | * | 11/1988 | Hough | B60R 13/0206 296/216.07 |
| 4,927,208 | A | * | 5/1990 | Farmont | B60J 7/1642 296/216.06 |
| 5,199,761 | A | * | 4/1993 | Dannecker | B60J 1/001 296/146.16 |
| 5,317,835 | A | * | 6/1994 | Dupuy | B60J 10/235 49/377 |

(Continued)

FOREIGN PATENT DOCUMENTS

| DE | 3624968 A1 * | 3/1987 | .............. B60J 7/08 |
| EP | 2614977 A1 * | 7/2013 | ............ B60J 10/265 |

(Continued)

*Primary Examiner* — Jerry E Redman
(74) *Attorney, Agent, or Firm* — Holtz, Holtz & Volek PC (57) ABSTRACT

A division bar for an automobile is provided between a movable door glass and a fixed quarter glass. The division bar includes an inner-cabin side member and an outer-cabin side member. The inner-cabin side member is formed by integrally molding a receiving part, an inner-cabin side lip, and a seal part. A core is embedded in the receiving part. The core is bendable in an inner-cabin and outer-cabin direction. The outer-cabin side member is formed by integrally molding an anchoring protrusion, an outer-cabin side lip, and a seal lip. The outer-cabin side member couples to the inner-cabin side member by fitting the anchoring protrusion into the receiving part with the outer-cabin side lip making elastic contact with an outer-cabin side surface of the door glass and with the seal lip making elastic contact with the seal part.

8 Claims, 8 Drawing Sheets

(56) References Cited

U.S. PATENT DOCUMENTS

| | | | | |
|---|---|---|---|---|
| 6,571,513 | B2* | 6/2003 | Maass | B60J 10/24 49/414 |
| 7,854,094 | B2* | 12/2010 | Zimmer | B60J 10/50 49/440 |
| 8,205,389 | B1* | 6/2012 | Kesh | B60J 10/88 49/440 |
| 2005/0188622 | A1* | 9/2005 | Nestell | B60J 10/78 49/441 |
| 2017/0087969 | A1* | 3/2017 | Dosaki | B60J 10/16 |
| 2019/0077230 | A1* | 3/2019 | Tallent | B60J 10/79 |
| 2021/0260976 | A1* | 8/2021 | Fukushima | B62D 65/024 |

FOREIGN PATENT DOCUMENTS

| | | | | |
|---|---|---|---|---|
| EP | 2692560 A1 | 2/2014 | | |
| GB | 2191234 A | * 12/1987 | | B60J 10/82 |
| GB | 2215284 A | * 9/1989 | | B60J 10/82 |
| JP | H04232137 A | 8/1992 | | |
| JP | H07277001 A | 10/1995 | | |
| JP | 2001010418 A | 1/2001 | | |
| JP | 2007276686 A | 10/2007 | | |
| JP | 2012210908 A | 11/2012 | | |
| JP | 2015003639 A | 1/2015 | | |
| WO | WO-2019016480 A1 | * 1/2019 | | B60J 10/78 |

* cited by examiner

DIVISION BAR FOR AUTOMOBILE AND METHOD OF MANUFACTURING DIVISION BAR

CROSS REFERENCE TO RELATED APPLICATION

This application claims the benefit under 35 USC § 119 of JP Patent Application JP 2020-027629 filed Feb. 20, 2020, the entire disclosure of which is incorporated herein by reference.

BACKGROUND INFORMATION

The present invention relates to a division bar for an automobile and a method of manufacturing the division bar. The division bar is provided between a movable door glass and a fixed quarter glass.

Figure 6:
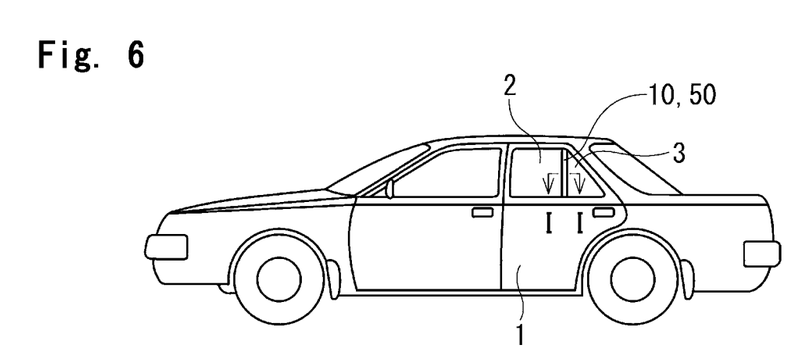
FIG. 6 is a side view of an automobile.

As illustrated in FIG. 6, a rear door 1 of some automobiles includes an ordinary division bar 10. The division bar 10 extends in an upper and lower direction of an automobile body and couples to the rear door 1 between a movable door glass 2 and a fixed quarter glass 3.

Figure 7:
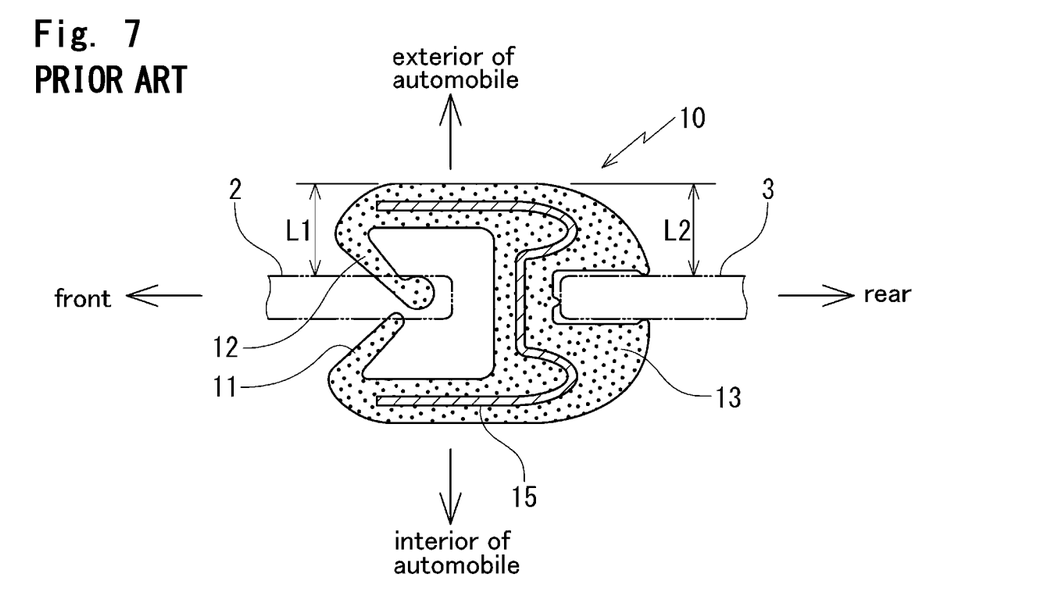
FIG. 7 is an enlarged cross-sectional view of a division bar according to a prior art for an automobile taken along line I-I of FIG. 6.

The division bar 10 in general has a cross-sectional shape illustrated in FIG. 7. The division bar 10 includes an inner-cabin side lip 11, an outer-cabin side lip 12, and a seal part 13. The inner-cabin side lip 11 makes elastic contact with an inner-cabin side surface of the door glass 2. The outer-cabin side lip 12 makes elastic contact with an outer-cabin side surface of the door glass 2. The seal part 13 fixes a peripheral edge of the quarter glass 3 (see, for example, Japanese Unexamined Patent Publication No. 07-277001).

A core 15 is embedded in the division bar 10 to increase rigidity. The core 15 has a substantially U-shaped cross section, and has an opening on a part closest to the door glass 2.

An outer-cabin side of the division bar 10 may be decorated with decorative substances, decorative tape, for example.

Figure 8:
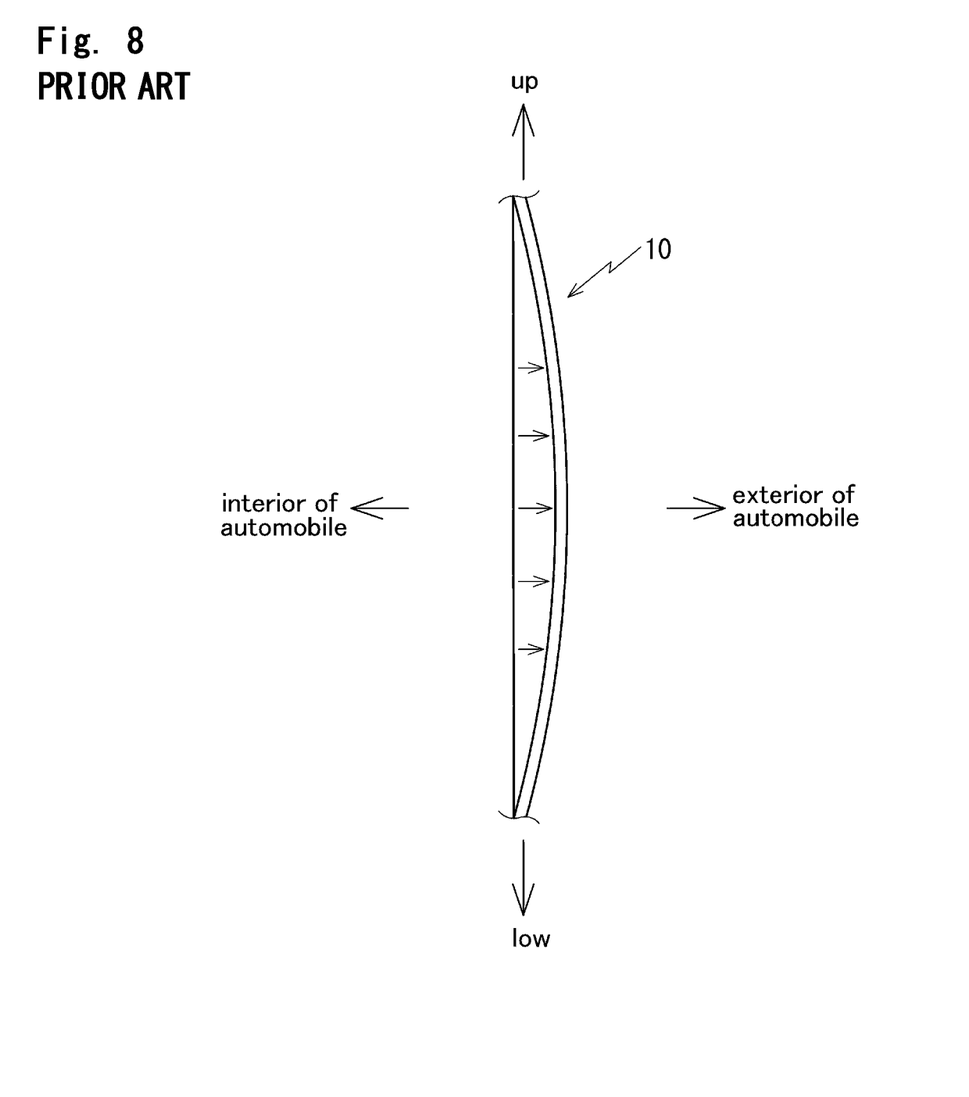
FIG. 8 is an enlarged side view of an important part of the division bar according to the prior art.

The inner-cabin side lip 11, the outer-cabin side lip 12, the seal part 13, and the core 15 of the division bar 10 illustrated in FIG. 7, are integrally molded by extrusion. Subsequently, the division bar 10 is subjected to bending to have a convex shape toward an exterior of the automobile as illustrated in FIG. 8 in accordance with a curvature of the door glass 2 before end parts and the like of the division bar 10 are molded by mold.

The bending is complicated, not simple, due to the core 15 embedded in the division bar 10 even in case the division bar 10 is made of rubber or TPO.

The core 15, which has the substantially U-shaped cross section, is wide in an inner-cabin and outer-cabin direction. Specifically, an outer-cabin side surface of the division bar 10 is distant from the outer-cabin side surface of the door glass 2 by a distance L1, and the outer-cabin side surface of the division bar 10 is distant from an outer-cabin side surface of the quarter glass 3 by a distance L2. The distances L1 and L2 form large differences in level and degrade appearance.

An object of the present invention is to provide the division bar and the method of manufacturing the division bar improved in appearance and work efficiency when manufacturing the division bar.

SUMMARY

In order to achieve the above-mentioned object, according to one aspect of the invention, a division bar (50) for an automobile is provided between a movable door glass (2) and a fixed quarter glass (3). A first part of the division bar (50) closer to the door glass (2) includes an inner-cabin side lip (37) and an outer-cabin side lip (47). The inner-cabin side lip (37) makes elastic contact with an inner-cabin side surface of the door glass (2) and the outer-cabin side lip (47) makes elastic contact with an outer-cabin side surface of the door glass (2). A second part of the division bar (50) closer to the quarter glass (3) includes a seal part (38). The seal part (38) fixes a peripheral edge of the quarter glass (3). The division bar (50) includes an inner-cabin side member (30) and an outer-cabin side member (40).

The inner-cabin side member (30) includes a receiving part (34), the inner-cabin side lip (37), and the seal part (38). The receiving part (34) has an opening on a part closest to an exterior of the automobile, a plurality of holding lips (36) on an inner side, and a core (35) embedded. The core (35) extends in an upper and lower direction of an automobile body, and is bendable in an inner-cabin and outer-cabin direction. The inner-cabin side lip (37) is integrally molded with a first part of the receiving part (34) closer to the door glass (2). The seal part (38) is integrally molded with a second part of the receiving part (34) closer to the quarter glass (3).

The outer-cabin side member (40) includes an anchoring protrusion (41), the outer-cabin side lip (47), and a seal lip (48), has a convex shape toward the exterior of the automobile from an interior, and extends in the upper and lower direction of the automobile body. The anchoring protrusion (41) extends toward the interior of the automobile. The outer-cabin side lip (47) is integrally molded with a first part of the outer-cabin side member (40) closer to the door glass (2). The seal lip (48) is integrally molded with a second part of the outer-cabin side member (40) closer to the quarter glass (3). The outer-cabin side member (40) is higher in rigidity than the inner-cabin side member (30).

The outer-cabin side member (40) couples to the inner-cabin side member (30) by fitting the anchoring protrusion (41) of the outer-cabin side member (40) into the receiving part (34) of the inner-cabin side member (30) with the outer-cabin side lip (47) of the outer-cabin side member (40) making elastic contact with the outer-cabin side surface of the door glass (2) and with the seal lip (48) making elastic contact with the seal part (38) or the quarter glass (3).

In addition, according to an aspect of the present invention, the outer-cabin side lip (47) diagonally extends toward the interior of the automobile from the exterior and approaches the door glass (2), and an inner-cabin side surface of the outer-cabin side lip (47) makes elastic contact with the outer-cabin side surface of the door glass (2).

In addition, according to an aspect of the present invention, the seal lip (48) diagonally extends toward the interior of the automobile from the exterior and approaches the quarter glass (3), and an inner-cabin side surface of the seal lip (48) makes elastic contact with an outer-cabin side surface of the seal part (38) or the quarter glass (3).

In addition, according to an aspect of the present invention, the core (35) has a substantially U-shaped cross section and has a shape of fish bone with a plurality of slits (35a) formed on at least one side of the core (35).

According to one aspect of the present invention, a method of manufacturing a division bar (50) for an automobile is provided. The division bar (50) is provided between a movable door glass (2) and a fixed quarter glass (3). A first part of the division bar (50) closer to the door glass (2) includes an inner-cabin side lip (37) and an outer-cabin side lip (47). The inner-cabin side lip (37) makes elastic contact with an inner-cabin side surface of the door glass (2) and the outer-cabin side lip (47) makes elastic contact with an outer-cabin side surface of the door glass (2). A second part of the division bar (50) closer to the quarter glass (3) includes a seal part (38). The seal part (38) fixes a peripheral edge of the quarter glass (3). The division bar (50) includes an inner-cabin side member (30) and an outer-cabin side member (40).

The inner-cabin side member (30) includes a receiving part (34), the inner-cabin side lip (37), and the seal part (38). The receiving part (34) has an opening on a part closest to an exterior of the automobile, a plurality of holding lips (36) on an inner side, and a core (35) embedded. The core (35) extends in an upper and lower direction of an automobile body, and is bendable in an inner-cabin and outer-cabin direction. The inner-cabin side lip (37) is integrally molded with a first part of the receiving part (34) closer to the door glass (2). The seal part (38) is integrally molded with a second part of the receiving part (34) closer to the quarter glass (3).

The outer-cabin side member (40) includes an anchoring protrusion (41), the outer-cabin side lip (47), and a seal lip (48), extends in the upper and lower direction of the automobile body, and is subjected to bending to have a convex shape toward the exterior of the automobile from an interior in accordance with curvatures of the door glass (2) and the quarter glass (3). The anchoring protrusion (41) extends toward the interior of the automobile. The outer-cabin side lip (47) is integrally molded with a first part of the outer-cabin side member (40) closer to the door glass (2). The seal lip (48) is integrally molded with a second part of the outer-cabin side member (40) closer to the quarter glass (3). The outer-cabin side member (40) is higher in rigidity than the inner-cabin side member (30).

The method includes forming a part of the inner-cabin side member (30) by integrally molding the receiving part (34), the core (35), and the inner-cabin side lip (37) by extrusion, then subjecting the part of the inner-cabin side member (30) to bending using bendability of the core (35) to have a convex shape toward the exterior of the automobile from the interior in accordance with the curvatures, arranging the quarter glass (3) as well as the part of the inner-cabin side member (30) on a mold die (100), and molding the seal part (38) by mold between the receiving part (34) and the quarter glass (3), pulling out the inner-cabin side member (30) from the mold (100), bringing the outer-cabin side member (40) close to the interior of the automobile to insert the anchoring protrusion (41) of the outer-cabin side member (40) into the receiving part (34) of the inner-cabin side member (30), and fitting the anchoring protrusion (41) of the outer-cabin side member (40) into the receiving part (34) of the inner-cabin side member (30), with the outer-cabin side lip (47) making elastic contact with the door glass (2) and with the seal lip (48) making elastic contact with the seal part (38) or the quarter glass (3).

Symbols in parentheses show constituents or items corresponding to the drawings.

According to the present invention, the division bar for the automobile includes the inner-cabin side member and the outer-cabin side member. The inner-cabin side member and the outer-cabin side member are two separate members. The outer-cabin side member is higher in rigidity than the inner-cabin side member and couples to the inner-cabin side member. The outer-cabin side member has the convex shape toward the exterior of the automobile from the interior, and extends in the upper and lower direction of the automobile body. The inner-cabin side member extends in the upper and lower direction of the automobile body, and the receiving part of the inner-cabin side member has the core embedded. The core embedded in the receiving part is bendable in the inner-cabin and outer-cabin direction. The core has the shape of fish bone, for example, to be bendable. With this configuration, the inner-cabin side member is easily curved in the inner-cabin and outer-cabin direction to fit the curve of the outer-cabin side member.

The outer-cabin side member couples to the inner-cabin side member by fitting the anchoring protrusion of the outer-cabin side member into the receiving part of the inner-cabin side member. At the same time, the outer-cabin side lip of the outer-cabin side member makes elastic contact with the outer-cabin side surface of the door glass, and the seal lip makes elastic contact with the seal part or the quarter glass.

This configuration eliminates the need for subjecting the division bar as a whole to bending as in the prior art, and reduces the complexity in processing.

In addition, the core is embedded in the receiving part of the inner-cabin side member. The core is not adjacent to the outer-cabin side lip of the outer-cabin side member as in the prior art. As a result, when the outer-cabin side member couples to the inner-cabin side member and the outer-cabin side member and the inner-cabin side member are joined together, width of the outer outer-cabin side lip in the inner-cabin and outer-cabin direction is reduced.

When the outer-cabin side member couples to the inner-cabin side member and the outer-cabin side member and the inner-cabin side member are joined together, a distance between the outer-cabin side surface of the outer-cabin side member and the door glass, with which the outer-cabin side lip makes elastic contact, is shorter than the prior art. With this configuration, a difference in level between the door glass and the outer-cabin side surface of the outer-cabin side member is reduced, and appearance is improved.

With the configuration that the outer-cabin side lip diagonally extends toward the interior of the automobile from the exterior and approaches the door glass, and the inner-cabin side surface of the outer-cabin side lip makes elastic contact with the outer-cabin side surface of the door glass, the difference in level between the door glass and the outer-cabin side surface of the outer-cabin side member is further reduced.

The core is not adjacent to the seal lip of the outer-cabin side member as in the prior art. As a result, when the outer-cabin side member couples to the inner-cabin side member and the outer-cabin side member and the inner-cabin side member are joined together, width of the seal lip in the inner-cabin and outer-cabin direction is reduced.

When the outer-cabin side member couples to the inner-cabin side member and the outer-cabin side member and the inner-cabin side member are joined together, a distance between the outer-cabin side surface of the outer-cabin side member and the seal part or the quarter glass, with which the outer-cabin side lip makes elastic contact, is shorter than the prior art. With this configuration, a difference in level between the quarter glass and the outer-cabin side surface of the outer-cabin side member is reduced, and appearance is improved.

With the configuration that the seal lip diagonally extends toward the interior of the automobile from the exterior and approaches the quarter glass, and the inner-cabin side surface of the seal lip makes elastic contact with the outer-cabin side surface of the seal part or the quarter glass, the difference in level between the quarter glass and the outer-cabin side surface of the outer-cabin side member is further reduced.

According to the present invention, the inner-cabin side member and the outer-cabin side member are separately manufactured. The outer-cabin side member couples to the inner-cabin side member. The inner-cabin side member is formed by integrally molding the receiving part, the core, and the inner-cabin side lip by extrusion, subjecting the receiving part, the core, and the inner-cabin side lip, which are integrally molding by extrusion, to bending using the bendability of the core to have the convex shape toward the exterior of the automobile from the interior in accordance with the curvatures of the door glass and the quarter glass, arranging the quarter glass as well as the receiving part, the core, and the inner-cabin side lip, which are subjected to bending, on the mold die, and molding the seal part by mold between the receiving part and the quarter glass. The inner-cabin side member is easily curved due to the bendability of the core without applying an excessive force to the inner-cabin side member in the mold.

The outer-cabin side member is subjected to bending to have the convex shape toward the exterior of the automobile from the interior in accordance with the curvatures of the door glass and the quarter glass. This configuration reduces the complexity in processing as compared with the configuration of the prior art that the division bar as the whole is subjected to bending. The outer-cabin side member is higher in rigidity than the inner-cabin side member, and includes the anchoring protrusion, the outer-cabin side lip, and the seal lip. The outer-cabin side member, without the core in an inner part as in the prior art, is easy to curve.

The outer-cabin side member couples to the inner-cabin side member by the following two steps. The outer-cabin side member is subjected to bending in advance in accordance with the curvature of the door glass. First, the outer-cabin side member is brought close to the interior of the automobile relative to the inner-cabin side member to insert the anchoring protrusion of the outer-cabin side member into the receiving part of the inner-cabin side member. Second, the inner-cabin side member is curved in the inner-cabin and outer-cabin direction using bendability of the core to fit the curve of the outer-cabin side member. With this configuration, even in case the outer-cabin side member does not couple to the inner-cabin side member tightly, the inner-cabin side member is easily curved as means for fine adjustment to insert the anchoring protrusion of the outer-cabin side member sufficiently into the receiving part of the inner-cabin side member on any position in the upper and lower direction.

DETAILED DESCRIPTION

Referring to FIGS. 1 to 4 and 6, a division bar according to an embodiment of the present invention for an automobile and a method according to the embodiment of the present invention of manufacturing the division bar will be described.

Figure 1:
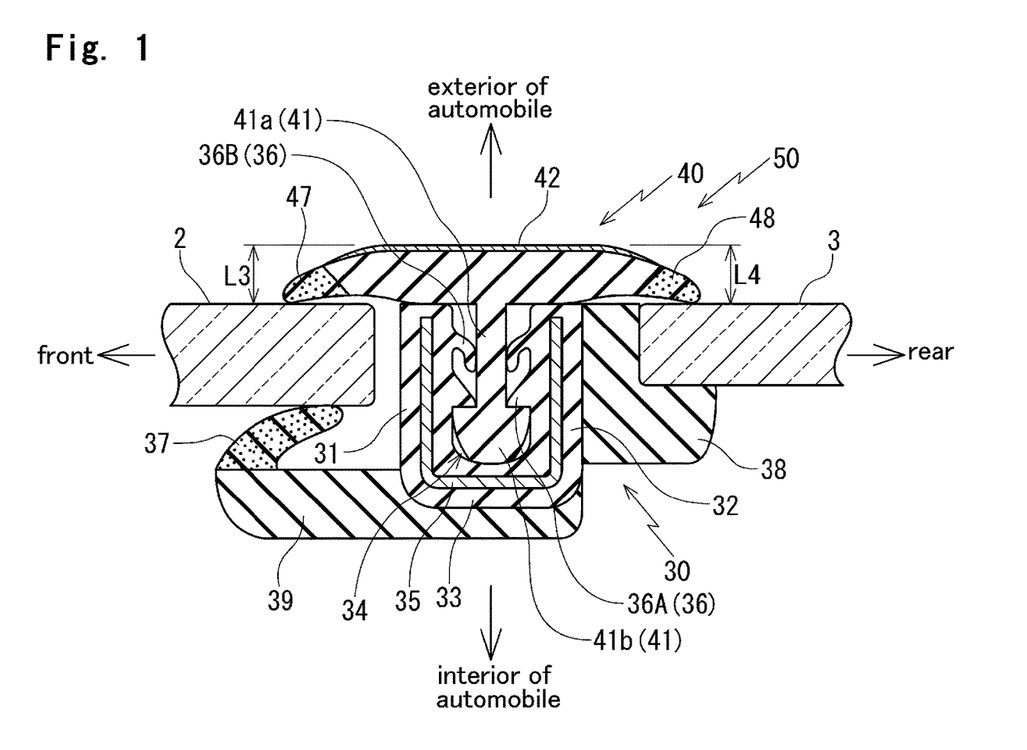
FIG. 1 is an enlarged cross-sectional view of a division bar according to an embodiment of the present invention for an automobile taken along line I-I of FIG. 6.

As illustrated in FIG. 1 and FIG. 6, a division bar 50 according to the embodiment of the present invention for an automobile couples to a rear door 1 between a movable door glass 2 and a fixed quarter glass 3. A first part of the division bar 50 closer to the door glass 2, that is closer to a front part of an automobile body, includes an inner-cabin side lip 37 and an outer-cabin side lip 47. The inner-cabin side lip 37 makes elastic contact with an inner-cabin side surface of the door glass 2 and the outer-cabin side lip 47 makes elastic contact with an outer-cabin side surface of the door glass 2. A second part of the division bar 50 closer to the quarter glass 3, that is closer to a rear part of the automobile body, includes a seal part 38. The seal part 38 fixes a peripheral edge of the quarter glass 3.

Figure 2:
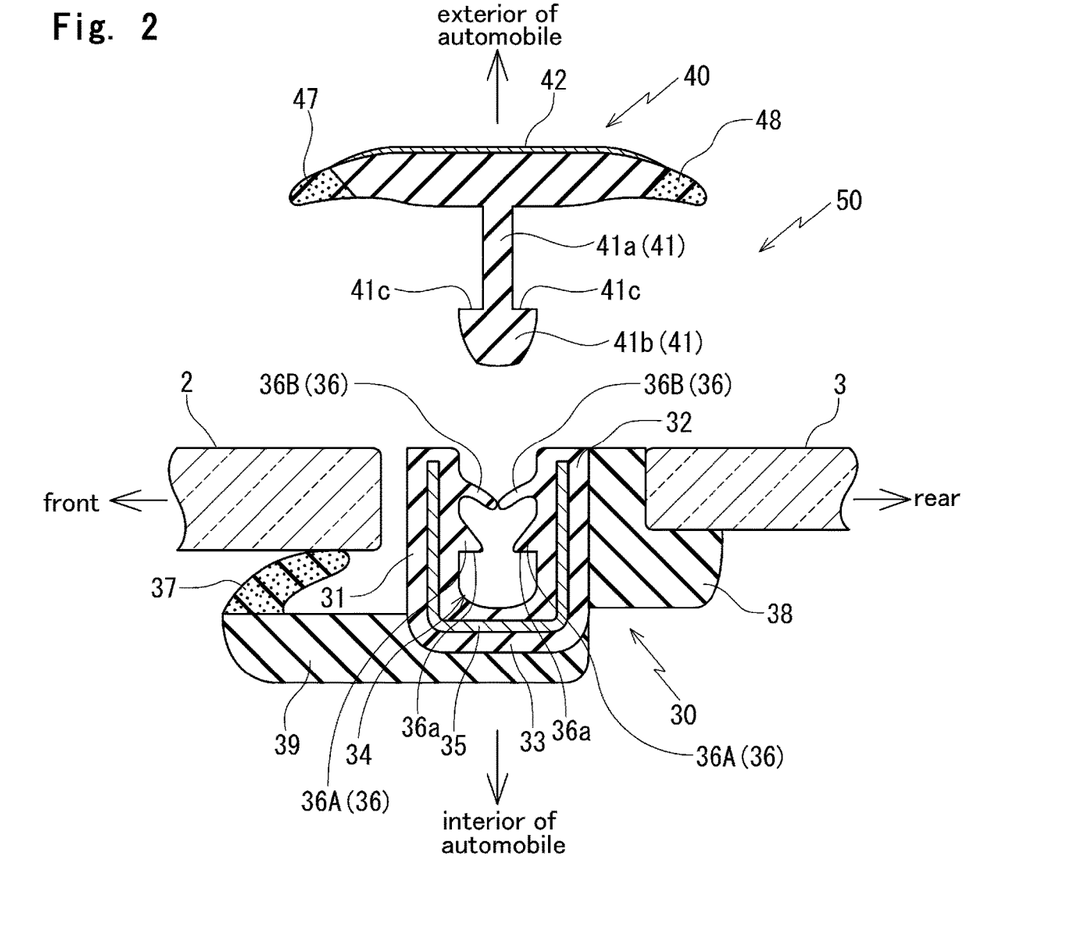
FIG. 2 is the cross-sectional view of the division bar of FIG. 1 with an outer-cabin side member detached from an inner-cabin side member.

The division bar 50 includes an inner-cabin side member 30 and an outer-cabin side member 40. The inner-cabin side member 30 and the outer-cabin side member 40 are two separate members as illustrated in FIG. 2. The outer-cabin side member 40 and the inner-cabin side member 30 as joined together as illustrated in FIG. 1 form the division bar 50.

The inner-cabin side member 30 includes a receiving part 34, the inner-cabin side lip 37, and the seal part 38. The receiving part 34 has a substantially U-shaped cross section and has an opening on a part closest to an exterior of the automobile. The inner-cabin side lip 37 is integrally molded with a first part of the receiving part 34 closer to the door glass 2. The seal part 38 is integrally molded with a second part of the receiving part 34 closer to the quarter glass 3.

The receiving part 34, which has the substantially U-shaped cross section, includes a first side wall 31, a second side wall 32, and a connecting wall 33. The first side wall 31 is closer to the door glass 2 and extends in an inner-cabin and outer-cabin direction. The second side wall 32 is closer to the quarter glass 3 and extends in the inner-cabin and outer-cabin direction. The connecting wall 33 connects the side walls 31, 32 and extends in a front and rear direction of the automobile body.

The receiving part 34 has a plurality of holding lips 36 on an inner side to fix and hold an anchoring protrusion 41 of the outer-cabin side member 40 to be discussed later. The holding lips 36 include two first holding parts 36A and two second holding parts 36B. The first holding parts 36A have shapes of a wedge with pressing surfaces 36a, and are formed on parts of inner surfaces of the first side wall 31 and the second side wall 32 closer to the connecting wall 33. The second holding parts 36B have shapes of a lip, are closer to the exterior of the automobile than the first holding parts 36A, and extend toward the connecting wall 33 from the inner surfaces of the first side wall 31 and the second side wall 32.

The receiving part 34 has a core 35 embedded. The core 35 has a substantially U-shaped cross section in accordance with the cross-sectional shape of the receiving part 34.

Figure 3:
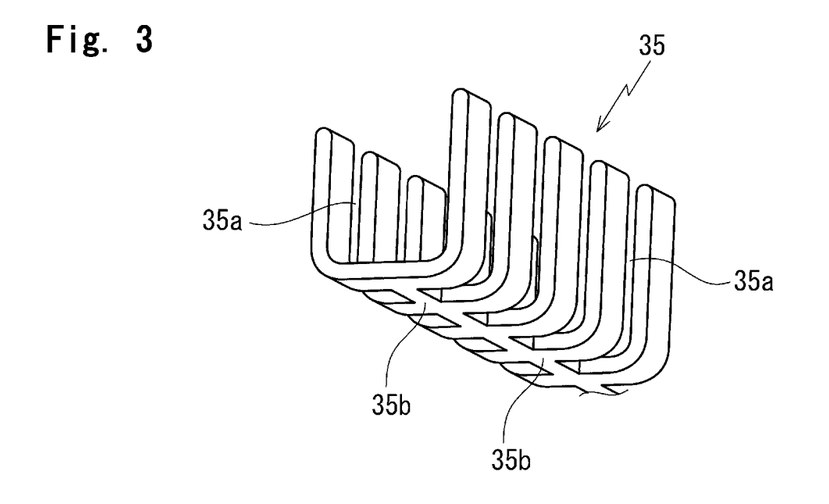
FIG. 3 is an enlarged perspective view of a core embedded in the division bar of FIG. 1.

The core 35 is bendable in an inner-cabin and outer-cabin direction. In the present embodiment, the core 35 has the substantially U-shaped cross section, and has a shape of fish bone with a plurality of slits 35a formed on both sides (or one side) of the core 35 as illustrated in FIG. 3. While in this embodiment the core 35 is formed by metal, the core 35 may be formed by resin. Connecting parts 35b of the core 35 are not easy to sever when the core 35 is bent in the inner-cabin and outer-cabin direction. The connecting parts 35b of the core 35 are arranged on the connecting wall 33 of the receiving part 34 when embedded in the receiving part 34.

The inner-cabin side lip 37 is formed on an outer-cabin side end of an supporting pillar 39 and makes elastic contact with the inner-cabin side surface of the door glass 2. The supporting pillar 39 extends toward the door glass 2 from an inner-cabin side of the connecting wall 33 of the receiving part 34.

The inner-cabin side lip 37 has a substantially tongue-shaped cross section. The inner-cabin side lip 37 diagonally extends toward the door glass 2, that is toward the exterior of the automobile, from the interior, approaches the first side wall 31 of the receiving part 34, and makes elastic contact with the inner-cabin side surface of the door glass 2.

The seal part 38 fixes an end of the quarter glass 3, and is fixed on the second side wall 32 of the receiving part 34. An outer-cabin side surface of the seal part 38 is level with an outer-cabin side surface of the quarter glass 3 and an end surface of the second side wall 32.

The inner-cabin side member 30 is formed by integrally molding the receiving part 34, the core 35, and the inner-cabin side lip 37 by extrusion, subjecting the receiving part 34, the core 35, and the inner-cabin side lip 37, which are integrally molded by extrusion, to bending using bendability of the core 35 to have the convex shape toward the exterior of the automobile from the interior in accordance with the curvature of the door glass 2 (same as the curvature of the quarter glass 3), arranging the quarter glass 3 as well as the receiving part 34, the core 35, and the inner-cabin side lip 37, which are subjected to bending, on a mold die 100, and molding the seal part 38 by mold by filling molding material between the receiving part 34 and the quarter glass 3.

Figure 4:
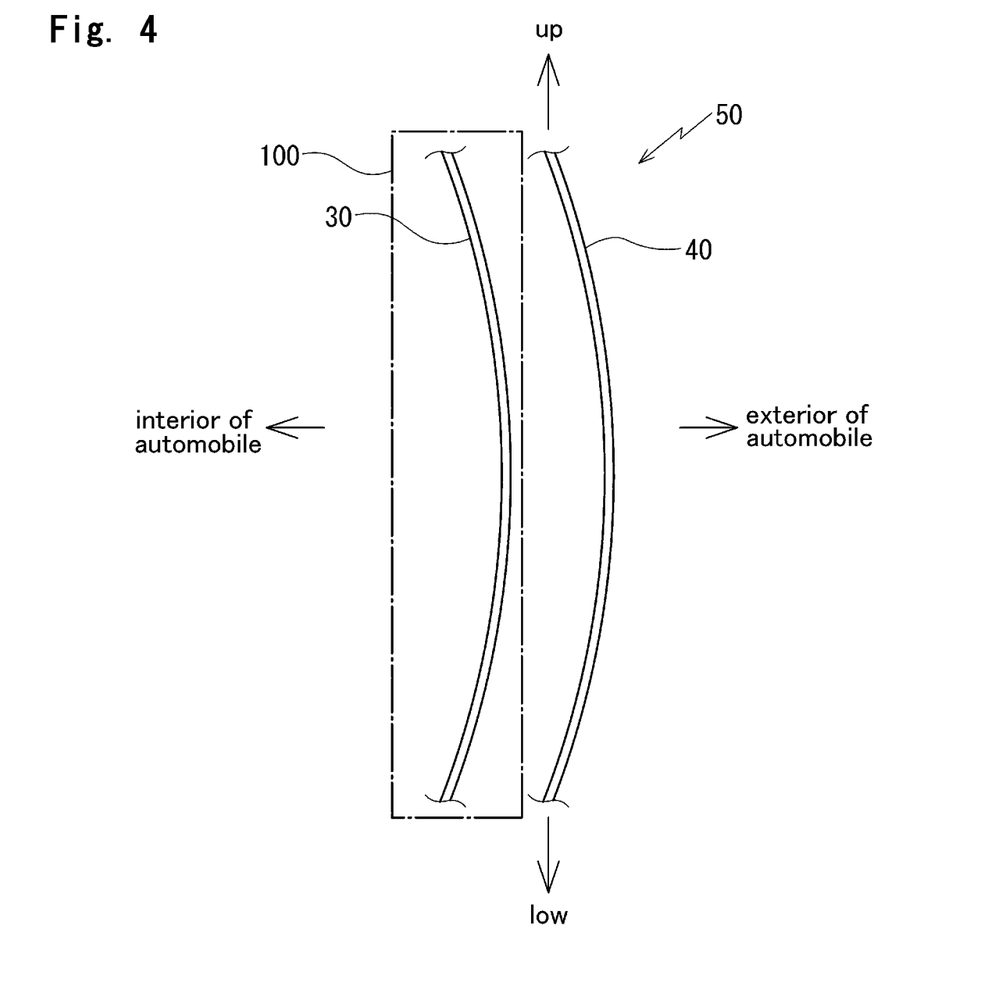
FIG. 4 is an enlarged side view of an important part of the division bar according to the embodiment of the present invention.

As a result, the inner-cabin side member 30, when arranged on the mold 100 as illustrated in FIG. 4, has the convex shape toward the exterior of the automobile from the interior in the same manner as the outer-cabin side member 40. Also, the inner-cabin side member 30, when pulled out from the mold 100, has the convex shape toward the exterior of the automobile from the interior in the same manner as the outer-cabin side member 40.

The receiving part 34, the seal part 38, and the supporting pillar 39 are formed by solid rubber material or solid resin material, and are lower in rigidity than the outer-cabin side member 40. The inner-cabin side lip 37 is formed by sponge rubber material or sponge resin material.

The outer-cabin side member 40 has a substantially T-shaped cross section, and includes the anchoring protrusion 41, the outer-cabin side lip 47, and the seal lip 48. The anchoring protrusion 41 is a leg part of the T-shaped cross section, and extends toward the interior of the automobile. The outer-cabin side lip 47 is formed a first end of a head part of the T-shaped cross section. The seal lip 48 is formed on a second end of the head part of the T-shaped cross section. A decorative member 42, decorative tape for example, is provided (may be omitted) on an outer-cabin side of the outer-cabin side member 40.

The anchoring protrusion 41 includes a protrusion bar 41a, a convex-shaped part 41b, and level surfaces 41c. The protrusion bar 41a extends toward the interior of the automobile from the head part of the T-shaped cross section. The convex-shaped part 41b is formed on a top end of the protrusion bar 41a and has a substantially bowl-shaped cross section. The level surfaces 41c are parts of the convex-shaped part 41b closest to the exterior of the automobile. When viewed from an upper side, the protrusion bar 41a is sandwiched between the level surfaces 41c.

The outer-cabin side lip 47 diagonally extends toward the interior of the automobile from the exterior and approaches the door glass 2. An inner-cabin side surface of the outer-cabin side lip 47 makes elastic contact with the outer-cabin side surface of the door glass 2.

The seal lip 48 diagonally extends toward the interior of the automobile from the exterior and approaches the quarter glass 3. An inner-cabin side surface of the seal lip 48 makes elastic contact with the outer-cabin side surface of the quarter glass 3.

The outer-cabin side member 40, except for the outer-cabin side lip 47 and the seal lip 48, is formed by solid rubber material or solid resin material, and is higher in rigidity than the inner-cabin side member 30. The outer-cabin side lip 47 and the seal lip 48 are formed by sponge rubber material or sponge resin material.

The outer-cabin side member 40 is integrally molded by extrusion, and is subjected to bending to have the convex shape toward the exterior of the automobile from the interior in accordance with the curvature of the door glass 2 (same as the curvature of the quarter glass 3) as illustrated in FIG. 4. While in this embodiment the outer-cabin side member 40 is molded by extrusion, the outer-cabin side member 40 may be molded by mold.

The outer-cabin side member 40 of the division bar 50 couples to the inner-cabin side member 30 as illustrated in FIG. 1 by fitting the anchoring protrusion 41 of the outer-cabin side member 40 into the receiving part 34 of the inner-cabin side member 30. At the same time, the outer-cabin side lip 47 of the outer-cabin side member 40 makes elastic contact with the outer-cabin side surface of the door glass 2, and the seal lip 48 makes elastic contact with the outer-cabin side surface of the quarter glass 3.

When coupling the outer-cabin side member 40 to the inner-cabin side member 30, the convex-shaped part 41b of the anchoring protrusion 41 passes through the two second holding parts 36B and the two first holding parts 36A from the exterior of the automobile, and is fit into an inner-cabin side of the first holding parts 36A. The pressing surfaces 36a of the two first holding parts 36A abut on the level surfaces 41c and closely contact with the level surfaces 41c. A top end of the convex-shaped part 41b is pressed against an outer-cabin side surface of the connecting wall 33 of the receiving part 34. The two second holding parts 36B make elastic contact with a circumferential surface of the protrusion bar 41a and fix the circumferential surface.

Now, a coupling structure of the outer-cabin side member 40 to the inner-cabin side member 30 will be described. The outer-cabin side member 40 is subjected to bending in accordance with the curvature of the door glass 2. The inner-cabin side member 30 is formed by molding the receiving part 34, the core 35, and the inner-cabin side lip 37 by extrusion, arranging on the mold die 100 with the quarter glass, and molding the seal part 38 by mold between the receiving part 34 and the quarter glass 3.

The inner-cabin side member 30 and the outer-cabin side member 40 have the convex shapes toward the exterior of the automobile from the interior in accordance with the curvature of the door glass 2 (same as the curvature of the quarter glass 3) as illustrated in FIG. 4.

The outer-cabin side member 40 is brought close to the inner-cabin side member 30 to couple the outer-cabin side member 40 to the inner-cabin side member 30. The outer-cabin side member 40 is higher in rigidity than the inner-cabin side member 30.

In other words, the outer-cabin side member 40 is brought close to the interior of the automobile from the exterior relative to the inner-cabin side member 30 to insert the anchoring protrusion 41 of the outer-cabin side member 40 into the receiving part 34 of the inner-cabin side member 30. As a result, the anchoring protrusion 41 of the outer-cabin side member 40 is fit into the receiving part 34 of the inner-cabin side member 30. At the same time, the outer-cabin side lip 47 makes elastic contact with the door glass 2, and the seal lip 48 makes elastic contact with the quarter glass 3.

The outer-cabin side member 40 couples to the inner-cabin side member 30 by the following two steps. First, the outer-cabin side member 40 is brought close to the interior of the automobile relative to the inner-cabin side member 30. Second, the inner-cabin side member 30 is curved in the inner-cabin and outer-cabin direction using bendability of the core 35 to fit the curve of the outer-cabin side member 40. With this configuration, even in case the outer-cabin side member 40 does not couple to the inner-cabin side member 30 tightly, the anchoring protrusion 41 of the outer-cabin side member 40 is sufficiently inserted into the receiving part 34 of the inner-cabin side member 30 on any position in an upper and lower direction of the automobile body merely by making fine adjustment. The fine adjustment is to curve the inner-cabin side member 30 in the inner-cabin and outer-cabin direction.

According to the embodiment of the present invention, the division bar 50 includes the inner-cabin side member 30 and the outer-cabin side member 40. The inner-cabin side member 30 and the outer-cabin side member 40 are two separate members. The outer-cabin side member 40 is higher in rigidity than the inner-cabin side member 30 and couples to the inner-cabin side member 30. The outer-cabin side member 40 has the convex shape toward the exterior of the automobile from the interior, and extends in the upper and lower direction of the automobile body. The inner-cabin side member 30 extends in the upper and lower direction of the automobile body, and the receiving part 34 of the inner-cabin side member 30 has the core 35 embedded. The core 35, embedded in the receiving part 34, has the shape of fish bone and is bendable in the inner-cabin and outer-cabin direction.

With this configuration, the inner-cabin side member 30 is easily curved in the inner-cabin and outer-cabin direction to fit the curve of the outer-cabin side member 40.

The outer-cabin side member 40 couples to the inner-cabin side member 30 by fitting the anchoring protrusion 41 of the outer-cabin side member 40 into the receiving part 34 of the inner-cabin side member 30. At the same time, the outer-cabin side lip 47 of the outer-cabin side member 40 makes elastic contact with the outer-cabin side surface of the door glass 2, and the seal lip 48 makes elastic contact with the quarter glass 3.

This configuration eliminates the need for subjecting the division bar 50 as a whole to bending as in the prior art, and reduces the complexity in processing.

In addition, the core 35 is embedded in the receiving part 34 of the inner-cabin side member 30. The core 35 is not adjacent to the outer-cabin side lip 47 of the outer-cabin side member 40 as in the prior art. As a result, when the outer-cabin side member 40 couples to the inner-cabin side member 30 and are joined together, width of the outer outer-cabin side lip 47 in the inner-cabin and outer-cabin direction is reduced.

When the outer-cabin side member 40 couples to the inner-cabin side member 30 and the outer-cabin side member 40 and the inner-cabin side member 30 are joined together, as illustrated in FIG. 1, a distance L3 between the outer-cabin side surface of the outer-cabin side member 40 and the door glass 2, with which the outer-cabin side lip 47 makes elastic contact, is shorter than the prior art. With this configuration, a difference in level between the door glass 2 and the outer-cabin side surface of the outer-cabin side member 40 is reduced, and appearance is improved.

With the configuration that the outer-cabin side lip 47 diagonally extends toward the interior of the automobile from the exterior and approaches the door glass 2, and the inner-cabin side surface of the outer-cabin side lip 47 makes elastic contact with the outer-cabin side surface of the door glass 2, the difference in level between the door glass 2 and the outer-cabin side surface of the outer-cabin side member 40 is further reduced.

The core 35 is not adjacent to the seal lip 48 of the outer-cabin side member 40 as in the prior art. As a result, when the outer-cabin side member 40 couples to the inner-cabin side member 30 and the outer-cabin side member 40 and the inner-cabin side member 30 are joined together, width of the seal lip 48 in the inner-cabin and outer-cabin direction is reduced.

When the outer-cabin side member 40 couples to the inner-cabin side member 30 and the outer-cabin side member 40 and the inner-cabin side member 30 are joined together, a distance L4 between the outer-cabin side surface of the outer-cabin side member 40 and the quarter glass 3, with which the seal lip 48 makes elastic contact, is shorter than the prior art. With this configuration, a difference in level between the quarter glass 3 and the outer-cabin side surface of the outer-cabin side member 40 is reduced, and appearance is improved.

With the configuration that the seal lip 48 diagonally extends toward the interior of the automobile from the exterior and approaches the quarter glass 3, and the inner-cabin side surface of the seal lip 48 makes elastic contact with the outer-cabin side surface of the quarter glass 3, the difference in level between the quarter glass 3 and the outer-cabin side surface of the outer-cabin side member 40 is further reduced.

While in this embodiment the seal lip 48 of the outer-cabin side member 40 makes elastic contact with the outer-cabin side surface of the quarter glass 3, the seal lip 48 may make elastic contact with an outer-cabin side surface of the seal part 38, not the quarter glass 3. The seal part 38 fixes the quarter glass 3.

In this embodiment, the core 35 of the inner-cabin side member 30 has the substantially U-shaped cross section, and has the shape of fish bone with the plurality of slits 35a formed on both sides of the core 35. But in this embodiment, it is only required that the core 35 extends in the upper and lower direction of the automobile body, and the core 35 is bendable in the inner-cabin and outer-cabin direction. Accordingly, this embodiment includes various modifications.

In addition, in this embodiment, it is only required that the anchoring protrusion 41 of the outer-cabin side member 40 is inserted into the receiving part 34 of the inner-cabin side member 30, attached to the receiving part 34, and is tightly fit into the receiving part 34. Accordingly, this embodiment includes various modifications other than the configurations illustrated in FIG. 1 and FIG. 2.

Figure 5:
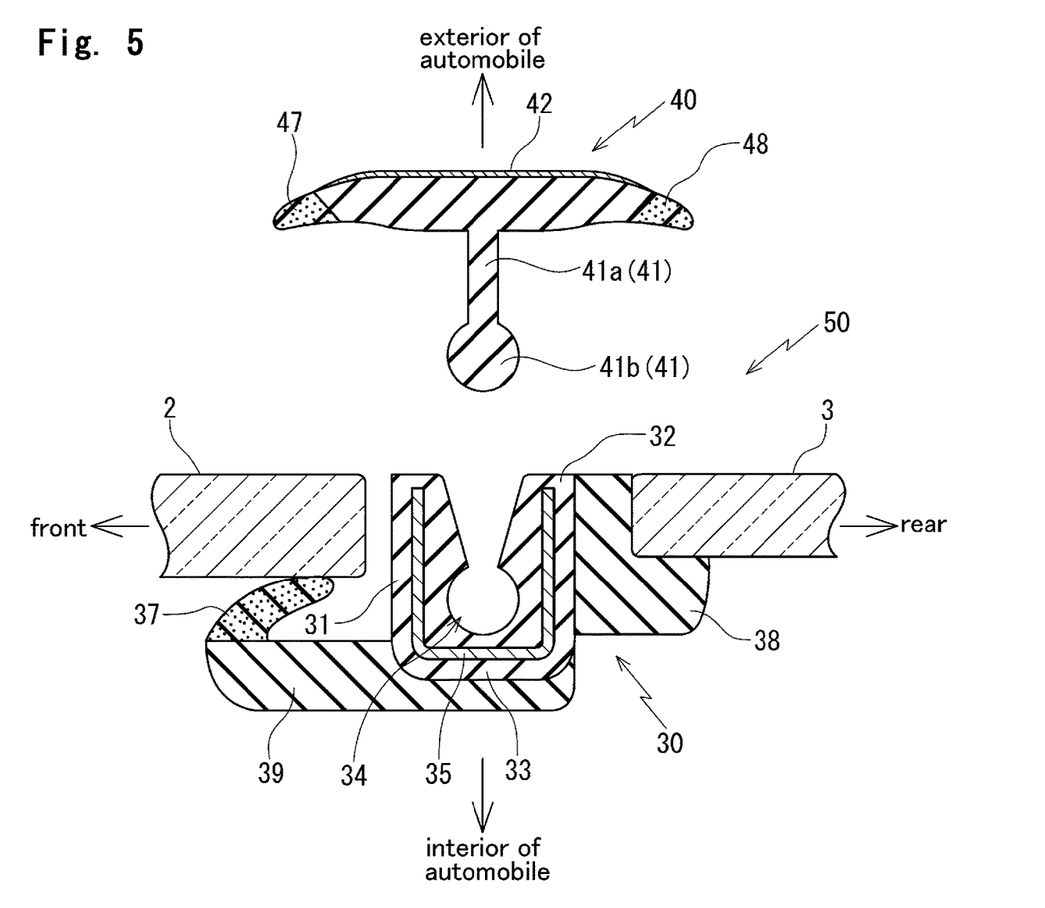
FIG. 5 is a cross-sectional view of the division bar according to another embodiment of the present invention with the outer-cabin side member detached from the inner-cabin side member.

Another possible embodiment is that, as illustrated in FIG. 5, the anchoring protrusion 41 is spherical and the receiving part 34 has a spherically-concave-shaped part to receive the anchoring protrusion 41.

While in this embodiment the division bar 50 is provided on the rear door 1, the division bar 50 may be provided on a front door.

We claim:

1. A division bar for an automobile, the division bar being provided between a movable door glass and a fixed quarter glass, a first part of the division bar closer to the door glass including an inner-cabin side lip and an outer-cabin side lip, the inner-cabin side lip being configured to make elastic contact with an inner-cabin side surface of the door glass, the outer-cabin side lip being configured to make elastic contact with an outer-cabin side surface of the door glass, a second part of the division bar closer to the quarter glass including a seal part, the seal part being configured to fix a peripheral edge of the quarter glass, the division bar comprising:

an inner-cabin side member which comprises:
a receiving part which includes an opening on a part closest to an exterior of the automobile, a plurality of holding lips on an inner side, and a core embedded therein, the core extending in an upper and lower direction of an automobile body, the core being bendable in an inner-cabin and outer-cabin direction;
the inner-cabin side lip integrally molded with a first part of the receiving part closer to the door glass; and
the seal part integrally molded with a second part of the receiving part closer to the quarter glass; and an outer-cabin side member which has a convex shape toward the exterior of the automobile from an interior, the outer-cabin side member extending in the upper and lower direction of the automobile body, the outer-cabin side member being higher in rigidity than the inner-cabin side member, the outer-cabin side member being configured to couple to the inner-cabin side member, the outer-cabin side member comprising:

an anchoring protrusion which extends toward the interior of the automobile, the anchoring protrusion being configured to be fit into the receiving part of the inner-cabin side member;
the outer-cabin side lip integrally molded with a first part of the outer-cabin side member closer to the door glass, the outer-cabin side lip being configured to make elastic contact with the outer-cabin side surface of the door glass when the anchoring protrusion is fit into the receiving part; and
a seal lip integrally molded with a second part of the outer-cabin side member closer to the quarter glass, the seal lip being configured to make elastic contact with the seal part or the quarter glass when the anchoring protrusion is fit into the receiving part.

2. The division bar as claimed in claim 1, wherein the outer-cabin side lip diagonally extends toward the interior of the automobile from the exterior and approaches the door glass, and an inner-cabin side surface of the outer-cabin side lip makes elastic contact with the outer-cabin side surface of the door glass.

3. The division bar as claimed in claim 2, wherein the seal lip diagonally extends toward the interior of the automobile from the exterior and approaches the quarter glass, and an inner-cabin side surface of the seal lip makes elastic contact with an outer-cabin side surface of the seal part or the quarter glass.

4. The division bar as claimed in claim 3, wherein the core has a substantially U-shaped cross section and has a plurality of slits formed on at least one side of the core.

5. The division bar as claimed in claim 2, wherein the core has a substantially U-shaped cross section and has a plurality of slits formed on at least one side of the core.

6. The division bar as claimed in claim 1, wherein the seal lip diagonally extends toward the interior of the automobile from the exterior and approaches the quarter glass, and an inner-cabin side surface of the seal lip makes elastic contact with an outer-cabin side surface of the seal part or the quarter glass.

7. The division bar as claimed in claim 6, wherein the core has a substantially U-shaped cross section and has a plurality of slits formed on at least one side of the core.

8. The division bar as claimed in claim 1, wherein the core has a substantially U-shaped cross section and has a plurality of slits formed on at least one side of the core.

* * * * *